(12) United States Patent
Gebizlioglu et al.

(10) Patent No.: US 6,612,006 B2
(45) Date of Patent: Sep. 2, 2003

(54) APPARATUS FOR EXTRACTING A FIBER FROM A FIBER-FERRULE

(75) Inventors: Osman S. Gebizlioglu, Flanders, NJ (US); Mustafa Ozgur, Denville, NJ (US)

(73) Assignee: Telcordia Technologies, Inc., Morristown, NJ (US)

(*) Notice: Subject to any disclaimer, the term of this patent is extended or adjusted under 35 U.S.C. 154(b) by 0 days.

(21) Appl. No.: 10/277,019

(22) Filed: Oct. 21, 2002

(65) Prior Publication Data

US 2003/0029013 A1 Feb. 13, 2003

Related U.S. Application Data

(62) Division of application No. 09/832,693, filed on Apr. 11, 2001, now Pat. No. 6,513,218.
(60) Provisional application No. 60/195,969, filed on Apr. 11, 2000.

(51) Int. Cl.[7] .......................... B23P 19/02; B23P 19/04; B23P 19/00
(52) U.S. Cl. .................... 29/235; 29/255; 29/762
(58) Field of Search .................... 29/426.4, 426.1, 29/426.5, 426.6, 403.3, 403.4, 33 M, 33 T, 729, 731, 747, 762, 235, 255, 282, DIG. 21; 385/96, 80, 85

(56) References Cited

U.S. PATENT DOCUMENTS 4,749,252 A * 6/1988 Yanagi et al. ............ 350/96.21

* cited by examiner

*Primary Examiner*—John C. Hong
(74) *Attorney, Agent, or Firm*—David A. Hey; Joseph Giordano

(57) ABSTRACT

Method and apparatus for extracting a fiber from connector. In accordance with our method the extraction does not compromise any failure evidence located within the ferrule of the fiber connector. The method comprises the steps of metallic etching, followed by adhesive etching, and a final step of heating and applying a load to the ferrule and/or fiber.

3 Claims, 2 Drawing Sheets

APPARATUS FOR EXTRACTING A FIBER FROM A FIBER-FERRULE

RELATED APPLICATIONS

The present application claims the benefit of U.S. Provisional Application No. 60/195,969 filed on Apr. 11, 2000 and entitled "Method for Accessing Fracture Surfaces of Fibers Failed in Optical Connectors".

This application is a divisional application of Ser. No. 09/832,693, filed Apr. 11, 2001, now U.S. Pat. No. 6,513,218.

This application is a divisional application of Ser. No. 09/832,693, filed Apr. 11, 2001, now U.S. Pat. No. 6,513,218.

FIELD OF THE INVENTION

Our invention generally relates to fiber optics and specifically to methods and systems for accessing fractured fibers in fiber optic connectors, more specifically fiber optic connector ferrules.

BACKGROUND

Ubiquitous deployment of fiber optic technology has increased the bandwidth and reliability of modem communication networks well beyond prior limits for copper and other competing technologies. A single fiber optic cable when installed in a network replaces thousands of copper lines. In fact, optical fibers are not considered to be bandwidth-limited. Despite the tremendous improvement in performance over the technology it replaced and continues to replace, fiber optic technology does present some problems.

Of particular import to the present invention is the problem of determining the root cause of mechanical failures in a fiber optic connector. Mechanical integrity of optical fibers is an essential element of assuring long-term reliable performance of fiber optic telecommunications networks. Loss of this mechanical integrity leads eventually to transmission failures in fiber optic network components such as cables, connectors and devices that make up the modem broadband telecommunications networks. When fiber mechanical failures occur, one needs to find the cause of such mechanical failures and determine the conditions under which these failures occur. Primary means of investigating fiber mechanical failures involves detailed examination of fiber fracture surfaces to find telltale signs of fracture events with clues to the mechanical forces involved, the geometry within which these forces might act on the fibers, and the magnitude of these forces. This detailed examination is known as fractography or break source analysis of fiber fracture surfaces.

In connectorized optical fibers, fiber breaks that take place within the connector body are not readily accessible for fractography. In fact, fiber fractures in connectors have often gone without any definitive fractography examination. As the bandwidth and capacity of modern telecommunications networks increase at an accelerating pace, it has become critically important to investigate even occasional fiber breaks in connectors due to its potentially high negative impact on both service providers' business and subscribers' communications needs.

In particular, and with reference to FIG. 1, a connector 100 generically consists of a metal base 110 and a ferrule 120. The ferrule 120 includes a central cylindrical opening or capillary 122 (typically having a 126-$\mu$m diameter). The capillary 122 is filled with an adhesive resin or epoxy fill 123 and a stripped and cleaned fiber 124 (typically having a 125-$\mu$m diameter) is inserted into the capillary 122. The adhesive resin 123 also fills the entry cone 128 and rear opening 130 of the connector along with the coated (unstripped) portion of the fiber 132 as is shown in FIG. 1. The adhesive is, then, cured, and, the fiber/ferrule tip 134 is polished to give a radiused surface. A connector assembly is then formed when two ferrule-fiber assemblies are mated and brought into physical contact on their polished surfaces. The adhesive in the capillary 122 (about 0.5-$\mu$m thickness between the ferrule and the fiber) serves to fix the fiber with respect to the ferrule and maintain the physical contact. Therefore, dimensional and mechanical stability of the ferrule-fiber assembly is critically important for satisfactory long-term performance and reliability of fiber optic PC connectors.

The prior art is devoid of methods and systems for extracting the bare and coated fiber from the connector without compromising the evidence that is critical to root cause analysis. Accordingly, the prior art does not allow for fractographic examination of fiber breaks if those breaks take place in the connector, in particular in the ferrule capillary. It is therefore an object of the present invention to provide a method and apparatus that enables fractographic examination of broken fibers to determine the root cause of fiber mechanical failures in connectors and devices.

SUMMARY

Our invention is a method and apparatus for extracting a fiber from a connector. In accordance with our invention, methods are presented to remove the metallic housing, adhesive bead/block near the ferrule entry cone and the annular adhesive film within the ferrule. Further, in accordance with our method, the fiber is extracted from the connector thereby allowing fratographic examination by Scanning Electron Microscopy (SEM).

Specifically, the process begins with removal of the metallic housing of the ferrule fiber assembly by a first acid-etching process wherein the acid bath is a mixture of hydrochloric acid and nitric acid. With the metallic housing removed, the ferrule-fiber assembly is then immersed in a bath of sulfuric acid, i.e., a second etching, is done to remove or loosen the adhesive resin in the ferrule capillary and back opening. After each acid-etching step, the ferrule-fiber assembly is rinsed with distilled water. Finally, localized heating is applied to the ferrule while a tensile load is applied to the fiber. The fiber is then extracted from the ferrule as a result of the localized heating and load application. If application of the tensile load and localized heating initially fails to extract the fiber, then the ferrule may be re-immersed in the solution of the second acid etching. The localized heating and application of the tensile load may then be repeated. Of course, localized heating under the force of the tensile load and the immersion into the sulfuric acid may be alternately repeated until extraction is successful.

Our invention advantageously allows for non-destructive extraction of the fiber from the ferrule so that further examination can be done of the fiber to determine the root cause of failures that occur as a result fractures of the fiber in the ferrule capillary.

DETAILED DESCRIPTION

Figure 2:
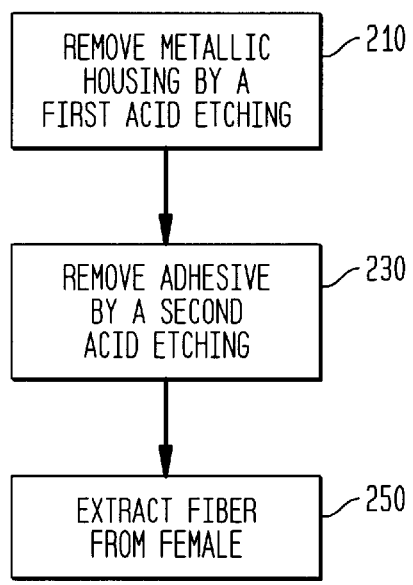
FIG. 2 is a flow chart of our inventive method for extracting a fiber from a ferrule.

Turning now to FIG. 2, there is depicted a flow chart describing the methods steps of our invention.

Figure 1:
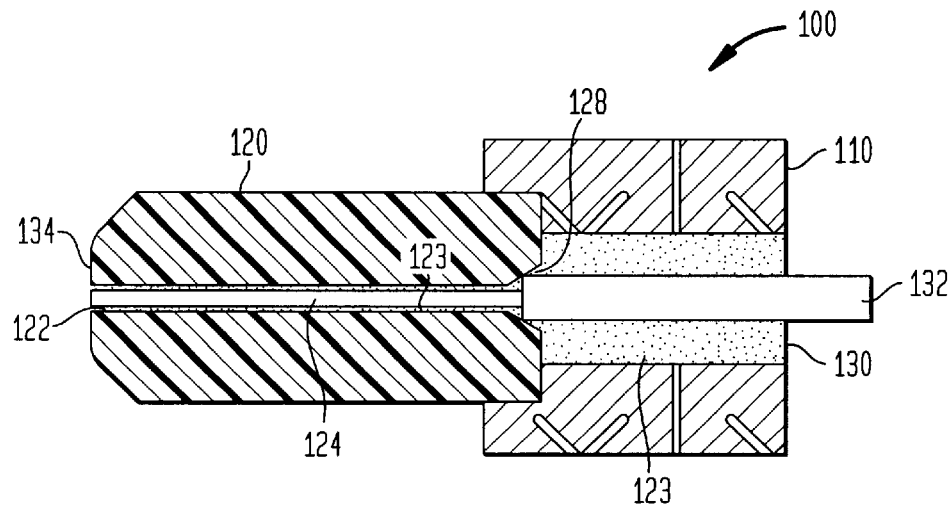
FIG. 1 depicts a generic connector.

Our method begins by removing the metallic housing of fiber connector by acid etching, step 210. The metallic base or housing (110 in FIG. 1) is typically made of stainless steel. Therefore, we immerse the ferrule fiber assembly in a mixture of hydrochloric acid (HCl) and nitric acid (HNO$_3$). The mixture can consist of ratios of 1:1 to ⅓:⅔. That is, the mixture can include any combination in the range from one part concentrated (30% to 40%) HCl to one part concentrated (68% to 70%) HNO$_3$ to one-third part concentrated HCl to two third part concentrated HNO$_3$. Of course the ratio of HCl to HNO$_3$ and the concentration of each substance within the mixture determines the acidity of the mixture which in turn determines the speed with which acidic etching takes place. This acid etching process may take place at room temperature, 22° C. to 25° C., at elevated temperatures, 50° C. to 100° C., or any temperature within the 22° C. to 100° C. range. Those of ordinary skill in the art will recognize that the ratio of the mixture, the respective concentrations of HCl and HNO$_3$, and the temperature at which this process takes place in effect determines the rate at which the etching takes place. In order to maintain some quality control over the acid etching process, we have generally performed the process at room temperature. At room temperature, we have found this step or stage to occur within a matter of minutes.

Once the metallic housing is etched away as previously described, the adhesive resin in the capillary 122, entry cone 128, and rear opening 130 (see FIG. 1) is then removed by a second acid etching, step 230. At step or stage 230, the fiber-ferrule assembly is then immersed in fuming or concentrated sulfuric acid (H$_2$SO$_4$). We have used sulfuric acid having concentration levels of 96%–99%. We have also found that adding relatively small amounts, 1%–5% concentration levels, of nitric acid (HNO$_3$) can increase the potency of the sulfuric acid. This step can be carried out at room temperature or an elevated temperature 50° C. to 200° C. We have found that at room temperature step or stage 230 can take several tens of minutes. Accordingly, we have performed this step 230 at an elevated temperature of 200° C. and obtained complete adhesive bead (in the capillary) and block (in the rear opening) removal in a matter of seconds.

At the final step or stage of our method, the bare fiber 124 (see FIG. 1) is extracted from the ferrule 120 (see FIG. 1), step 250, by localized heating of the ferrule while keeping the fiber under a tensile load. This step requires preparatory work to determine the thermal degradation profile of the adhesive used in the ferrule-fiber assembly. The preparatory work requires a determination of the temperature at which the adhesive degrades. Thermal analysis of cured adhesive samples by Differential Scanning Calorimetry and Thermogravimetric Analysis are known methods for determining the degradation temperature of an adhesive. Differential Scanning Calorimetry provides thermal transition temperatures such as the glass transition temperature for the adhesive while Thermogravimetric Analysis enable one to determine the temperature and time of adhesive degradation. In some instances, the preparatory work may simply involve looking up the degradation time and temperature profile of the adhesive in a manual.

Figure 3:
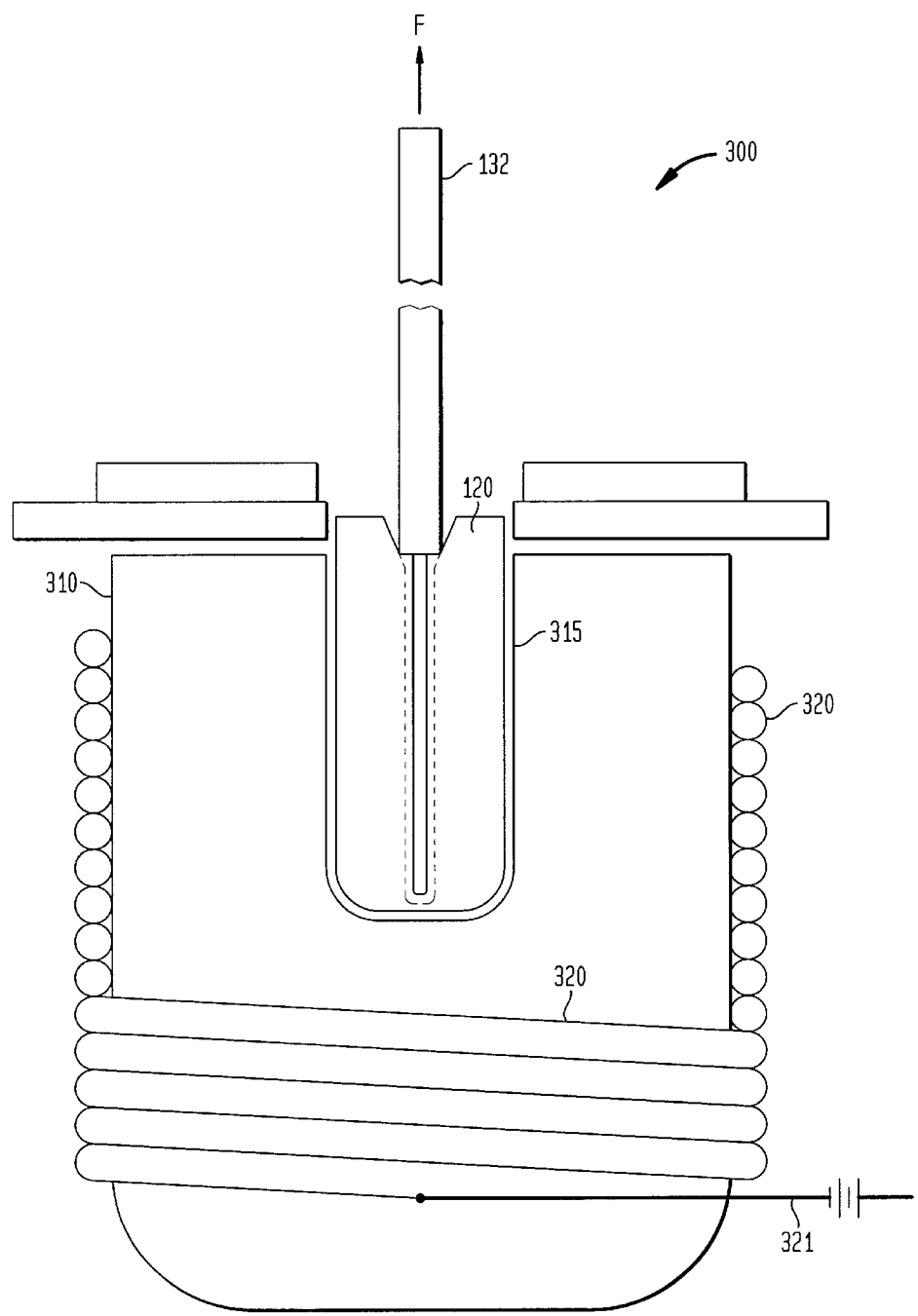
FIG. 3 depicts our inventive apparatus for extracting a fiber from a connector.

Once the degradation time and temperature of the adhesive is known, the ferrule-fiber assembly is placed in a fiber extraction unit. Our fiber extraction unit is shown in FIG. 3 and its structure is fully discussed below. The important functional features with regard to extraction are a means for providing localized heating and a fiber tension means for extracting the fiber from the ferrule. Localized heating is preferable so as to minimize exposure of the fiber to high temperatures that can run from 300° C. to 600° C. depending on the type of adhesive resin in the capillary. The fiber tension means or element maintains a tensile load of a few hundred milligrams on the fiber as the ferrule is heated until the fiber is extracted. Here, those of ordinary skill in the art will recognize that there is a trade off between the force of the load and the temperature at which heating takes place. That is, if too great a tensile load is placed on the ferrule before the time and temperature for adhesive degradation is reached, the evidence that is sought may be destroyed. In addition, if application of the tensile load and localized heating initially fails to extract the fiber, then the ferrule may then be re-immersed in the sulfuric acid (H$_2$SO$_4$) solution used in step 230. The localized heating and application of the tensile load would then be repeated. Of course, localized heating under the force of the tensile load and the immersion into the sulfuric acid may be alternately repeated until extraction is successful. Conceptually, the idea here is to heat the adhesive resin to the point where it releases the fiber and if release does not happen under a normal tensile load then re-immersion in the sulfuric acid enhances the chance that on the next pull the fiber will be extracted.

We will now turn to FIG. 3 and describe the apparatus 300 we invented and built to perform step or stage 250 described above. As FIG. 3 shows apparatus 300 has a heating block 310 into which an opening 315 is constructed. The heating block 310 can be made of copper. The opening 315 is constructed so as to receive only the ferrule 120 to minimize exposure of the fiber to the high temperature that occurs during heating. An electric coil 320 which is powered by a voltage source 321 is wound around the heating block 310. The wound heating coil provides localized heating to heating block and in turn to the adhesive in the ferrule. Fiber tension is applied to the coated portion of the fiber 132 as is illustrated by force F until the fiber is extracted. Those of ordinary skill will note that there are numerous ways in which to apply force F.

A fiber extracted in accordance with our invention is then available for further analysis using a Scanning Electron Microscope or other known means for identifying fiber break source.

The above description has been presented only to illustrate and describe the invention. It is not intended to be exhaustive or to limit the invention to any precise form disclosed. Many modifications and variations are possible in light of the above teaching. The applications described were chosen and described in order to best explain the principles of the invention and its practical application to enable others skilled in the art to best utilize the invention on various applications and with various modifications as are suited to the particular use contemplated.

We claim:

1. An apparatus for extracting a fiber from a fiber-ferrule assembly, said fiber-ferrule assembly comprising a ferrule having a central capillary opening, a fiber situated within said capillary opening of said ferrule, and an adhesive resin securing said fiber in said capillary opening of said ferrule, said apparatus comprising:

a heating block having an opening for receiving said fiber-ferrule assembly;

means for changing the temperature of said heating block; and means for applying a tensile load to said fiber;

wherein the temperature of said heating block is elevated by said means for changing the temperature and said tensile load is applied to said fiber to extract said fiber from said ferrule.

2. The apparatus of claim 1 wherein said heating block comprises a copper heating block.

3. The apparatus of claim 1 wherein said means for changing the temperature comprises a heating coil wound around said heating block and connected to a power source.

* * * * *